United States Patent
Yabe et al.

(10) Patent No.: US 11,503,885 B2
(45) Date of Patent: Nov. 22, 2022

(54) ATTACHMENT SYSTEMS FOR ELECTRONIC DEVICES

(71) Applicant: Apple Inc., Cupertino, CA (US)

(72) Inventors: Osamu Yabe, Mountain View, CA (US); Derek C. Krass, Santa Cruz, CA (US); Scott W. Slabaugh, Gilroy, CA (US); Michael Brickner, Cupertino, CA (US); Julian Hoenig, San Francisco, CA (US); Wayne Cowan, Santa Clara, CA (US); Rico Zörkendörfer, San Francisco, CA (US); Christopher J. Stringer, Woodside, CA (US); Ian Davison, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/122,963

(22) Filed: Dec. 15, 2020

(65) Prior Publication Data
US 2021/0137226 A1 May 13, 2021

Related U.S. Application Data

(63) Continuation of application No. 15/996,279, filed on Jun. 1, 2018, now Pat. No. 10,893,726, which is a
(Continued)

(51) Int. Cl.
*A44C 5/14* (2006.01)
*A44C 5/20* (2006.01)
(Continued)

(52) U.S. Cl.
CPC ............ *A44C 5/147* (2013.01); *A44C 5/0053* (2013.01); *A44C 5/14* (2013.01); *A44C 5/2071* (2013.01);
(Continued)

(58) Field of Classification Search
CPC ......... A44C 5/147; A44C 5/0053; A44C 5/14; A44C 5/2071; B29C 32/18; B29D 29/00; G04B 37/1486; Y10T 24/4782
See application file for complete search history.

(56) References Cited

U.S. PATENT DOCUMENTS

| | | |
|---|---|---|
| 2,126,263 A | 8/1938 | Kestenman |
| 2,346,887 A | 4/1944 | Winkler |

(Continued)

FOREIGN PATENT DOCUMENTS

| | | |
|---|---|---|
| CN | 2052214 U | 2/1990 |
| CN | 1147358 | 4/1997 |

(Continued)

OTHER PUBLICATIONS

Author Unknown, "Ikepod Wristwatches by Mark Newson," http://www.dezeen.com/2007/12/10/ikepod-wristwatches-by-marc-newson/, 32 pages, Dec. 10, 2007.
(Continued)

*Primary Examiner* — Victor D Batson
*Assistant Examiner* — Matthew J Sullivan
(74) *Attorney, Agent, or Firm* — BakerHostetler

(57) ABSTRACT

Attachment systems for attaching a wearable electronic device to a user including a sizing band and a retaining band are disclosed. The sizing band includes at least one sizing eyelet and a band-insertable end. The retaining band includes at least a post for insertion into the sizing eyelet of the sizing band and a concealment aperture configured to receive the band-insertable end of the sizing band. On a bottom surface of the retaining band can be a recessed guide bed configured to guide the band-insertable end along the bottom surface of the retaining band. A wearable electronic device can couple to both the sizing band and the retaining
(Continued)

band by accepting an end portion of each band into receiving channels extending into opposite sidewalls of the housing.

25 Claims, 10 Drawing Sheets

Related U.S. Application Data continuation of application No. 14/696,406, filed on Apr. 25, 2015, now Pat. No. 10,016,029.

(60) Provisional application No. 62/041,733, filed on Aug. 26, 2014, provisional application No. 62/036,035, filed on Aug. 11, 2014, provisional application No. 62/035,403, filed on Aug. 9, 2014.

(51) Int. Cl.
  G04B 37/14    (2006.01)
  B29D 29/00    (2006.01)
  A44C 5/00     (2006.01)
  B29C 43/18    (2006.01)
  B29L 31/00    (2006.01)

(52) U.S. Cl.
  CPC ........... B29C 43/18 (2013.01); B29D 29/00 (2013.01); G04B 37/1486 (2013.01); *B29L 2031/729* (2013.01); *B29L 2031/739* (2013.01)

(56) References Cited

U.S. PATENT DOCUMENTS

| | | | |
|---|---|---|---|
| 2,408,279 A | 9/1946 | Valcourt | |
| 2,505,044 A | 4/1950 | Heinrich | |
| 2,518,551 A | 8/1950 | Jaccarino | |
| 2,871,592 A | 2/1959 | Polzin | |
| 3,293,714 A | 12/1966 | Shafer | |
| 3,376,616 A | 4/1968 | Kaczorowski | |
| 3,589,341 A | 6/1971 | Krebs | |
| 3,675,284 A | 7/1972 | Rieth | |
| 3,747,171 A | 7/1973 | Montague, Jr. | |
| D250,881 S * | 1/1979 | Liautaud | D10/38 |
| 4,178,751 A * | 12/1979 | Liautaud | G04B 37/1486 |
| | | | 968/327 |
| 4,249,267 A | 2/1981 | Voss | |
| 4,414,714 A | 11/1983 | Kostanecki et al. | |
| 4,447,238 A | 5/1984 | Eldridge, Jr. | |
| 4,615,185 A * | 10/1986 | Bollinger | A44C 5/2076 |
| | | | 63/3.1 |
| 4,941,236 A | 7/1990 | Sherman et al. | |
| 5,130,899 A | 7/1992 | Larkin et al. | |
| 5,146,437 A | 9/1992 | Boucheron | |
| 5,181,192 A * | 1/1993 | Paratte | G04C 10/00 |
| | | | 368/204 |
| 5,244,134 A | 9/1993 | Riley | |
| 5,305,503 A | 4/1994 | Yamagata | |
| 5,307,582 A | 5/1994 | Quintel | |
| 5,668,784 A | 9/1997 | Iguchi | |
| 5,914,913 A | 6/1999 | Shriqui | |
| 6,067,692 A | 5/2000 | Chang | |
| 6,163,938 A | 12/2000 | WebeR Unger | |
| 6,168,055 B1 | 1/2001 | Grados | |
| 6,170,131 B1 | 1/2001 | Shin | |
| 6,179,025 B1 | 1/2001 | Sutton | |
| 6,292,985 B1 | 9/2001 | Grunberger | |
| 6,311,373 B1 | 11/2001 | Hashimoto | |
| 6,505,385 B2 | 1/2003 | Grunberger | |
| 6,588,069 B2 | 7/2003 | Deriaz et al. | |
| 6,598,271 B2 | 7/2003 | Nire | |
| 6,606,767 B2 | 8/2003 | Wong | |
| 6,647,597 B2 | 11/2003 | Reiter | |
| 6,678,898 B2 | 1/2004 | Jones et al. | |
| 6,701,580 B1 | 3/2004 | Bandyopadhyay | |
| 6,726,070 B2 | 4/2004 | Lautner | |
| 6,746,058 B2 | 6/2004 | Kienzler | |
| 7,243,824 B2 | 7/2007 | Tabata | |
| 7,363,687 B2 | 4/2008 | Kraus et al. | |
| 7,373,696 B2 | 5/2008 | Schoening et al. | |
| 7,480,967 B2 | 1/2009 | Kojoori et al. | |
| 7,526,840 B2 * | 5/2009 | Pernu | A44C 5/14 |
| | | | 24/265 WS |
| 7,640,632 B2 | 1/2010 | Lazarus | |
| 7,806,309 B2 | 10/2010 | Korchmar | |
| 7,905,039 B2 | 3/2011 | Karovic | |
| 8,088,043 B2 | 1/2012 | Andren et al. | |
| 8,091,261 B2 | 1/2012 | Chadwick | |
| 8,250,797 B2 | 8/2012 | Padgett et al. | |
| 8,261,416 B2 | 9/2012 | Rothbaum et al. | |
| 8,316,515 B2 | 11/2012 | Slank | |
| 8,471,658 B2 | 6/2013 | Fullerton et al. | |
| 8,486,481 B2 | 7/2013 | Giuseppin et al. | |
| 8,573,458 B1 | 11/2013 | Hamilton | |
| 8,578,569 B1 | 11/2013 | Karnoski et al. | |
| 8,615,849 B2 | 12/2013 | Rothbaum et al. | |
| 8,787,006 B2 | 7/2014 | Golko et al. | |
| 8,789,246 B2 | 7/2014 | Yliluoma et al. | |
| D711,872 S * | 8/2014 | Aumiller | D14/344 |
| 8,967,437 B2 | 3/2015 | Wilson | |
| 9,003,611 B2 | 4/2015 | Catanese | |
| 9,049,894 B2 | 6/2015 | Wong | |
| 9,392,829 B2 | 7/2016 | Manuello | |
| 2005/0102802 A1 | 5/2005 | Sitbon et al. | |
| 2005/0265132 A1 * | 12/2005 | Ho | A44C 5/14 |
| | | | 368/282 |
| 2006/0156520 A1 | 7/2006 | Meranto | |
| 2006/0186150 A1 | 8/2006 | Willows et al. | |
| 2006/0254105 A1 | 11/2006 | Chang | |
| 2007/0028429 A1 | 2/2007 | Ishida | |
| 2009/0133438 A1 | 5/2009 | Stampfli et al. | |
| 2009/0265832 A1 | 10/2009 | Clement | |
| 2010/0200627 A1 | 8/2010 | Shen | |
| 2010/0258601 A1 | 10/2010 | Thrope | |
| 2011/0083254 A1 | 4/2011 | Trutna et al. | |
| 2011/0309121 A1 | 12/2011 | Dooley et al. | |
| 2012/0216374 A1 | 8/2012 | Manuello | |
| 2013/0086774 A1 | 4/2013 | Krasinski et al. | |
| 2013/0205476 A1 | 8/2013 | Gentile et al. | |
| 2013/0326790 A1 | 12/2013 | Cauwels et al. | |
| 2014/0083133 A1 * | 3/2014 | Lee | A44C 5/14 |
| | | | 63/3.1 |
| 2016/0003269 A1 | 1/2016 | Russell-Clarke et al. | |
| 2016/0010673 A1 | 1/2016 | Russell-Clarke et al. | |
| 2016/0025119 A1 | 1/2016 | Russell-Clarke et al. | |
| 2016/0069371 A1 | 3/2016 | Chen et al. | |
| 2016/0223992 A1 * | 8/2016 | Seo | G04G 19/10 |
| 2016/0255923 A1 * | 9/2016 | Lee | A44C 25/004 |
| 2019/0298007 A1 * | 10/2019 | Velger | A41D 3/00 |

FOREIGN PATENT DOCUMENTS

| | | |
|---|---|---|
| CN | 2575724 Y | 9/2003 |
| CN | 2706786 Y | 6/2005 |
| CN | 200983868 Y | 12/2007 |
| CN | 201709560 U | 1/2011 |
| CN | 102202533 | 9/2011 |
| CN | 202026953 U | 11/2011 |
| CN | 202060129 U | 12/2011 |
| CN | 202587325 U | 12/2012 |
| CN | 202664274 U | 1/2013 |
| CN | 202704189 U | 1/2013 |
| CN | 103488076 | 1/2014 |
| DE | 102006004716 | 8/2007 |
| EP | 20981312 | 9/2009 |
| FR | 1291875 | 4/1962 |
| FR | 2492238 | 4/1982 |
| FR | 2532239 | 3/1984 |
| GB | 464417 | 4/1937 |
| GB | 865498 | 4/1961 |
| GB | 1491532 | 11/1977 |
| GB | 2113975 | 8/1983 |
| GB | 2355281 | 4/2001 |

(56) References Cited

FOREIGN PATENT DOCUMENTS

| WO | WO 2010/0360902 | 4/2010 |
| WO | WO 2011/0048344 | 4/2011 |
| WO | WO 2012/1601952 | 11/2012 |

OTHER PUBLICATIONS

Author Unknown, "Tajan," http://www.tajan.com/pdf/7812.pdf, 2 pages, Dec. 10, 2007.
Author Unknown, "v2.0 Ikepod Has Landed . . . again . . . ," http://qp.granularit.com/media/38876/QP24_Ikepod.pdf, 3 pages, at least as early as Apr. 25, 2015.
Chinese Evaluation Report of Utility Model Patent from Chinese Patent Application No. ZL201620273810.9, dated Apr. 12, 2017.
International Search Report and Written Opinion, PCT/US2015/043917, 21 pages, dated Jan. 29, 2016.
Invitation to Pay Additional Fees, PCT/US2015/043917, 5 pages, Oct. 9, 2015.

\* cited by examiner

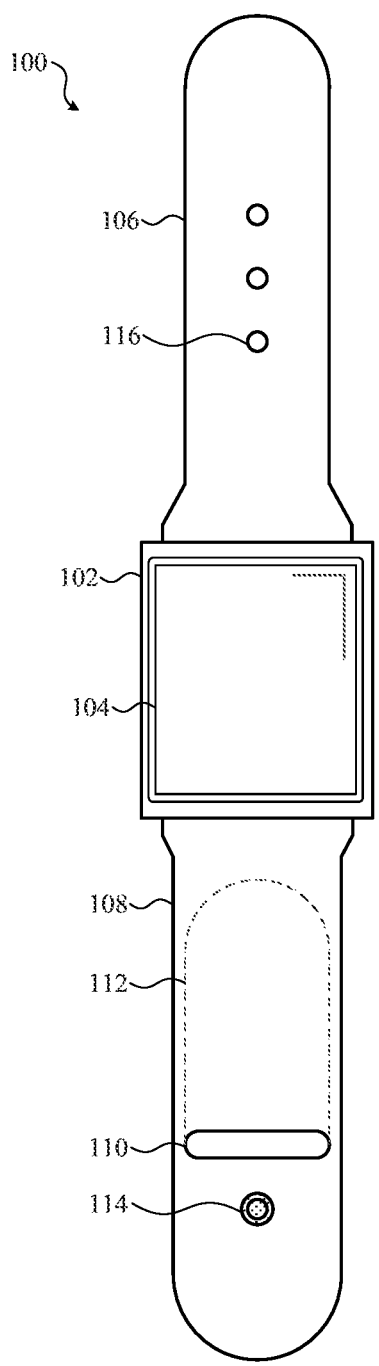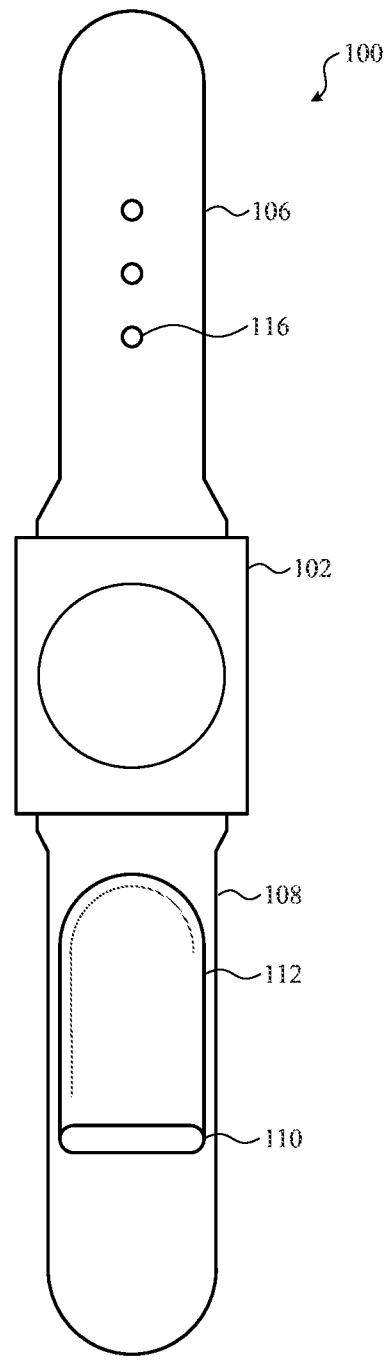
FIG. 1A
FIG. 1B

PRESS FIT POST INTO BASE AROUND INSERT MOLDED WASHER ~1000

*FIG. 10*

ATTACHMENT SYSTEMS FOR ELECTRONIC DEVICES

CROSS-REFERENCE TO RELATED APPLICATIONS

This application is a continuation of U.S. patent application Ser. No. 15/996,279, filed Jun. 1, 2018, which is a continuation of U.S. patent application Ser. No. 14/696,406, filed Apr. 25, 2015, now U.S. Pat. No. 10,016,029, which is a nonprovisional patent application of and claims the benefit to U.S. Provisional Patent Application No. 62/035,403, filed Aug. 9, 2014 and titled "Attachment Systems for Electronic Devices," U.S. Provisional Patent Application No. 62/036,035, filed Aug. 11, 2014 and titled "Attachment Systems for Electronic Devices," and U.S. Provisional Patent Application No. 62/041,733, dated Aug. 26, 2014 and titled "Attachment Systems for Electronic Devices," the disclosures of which are hereby incorporated herein in their entireties.

TECHNICAL FIELD

Embodiments described herein relate to systems for affixing an electronic device to an object and, more particularly, to mechanisms for removably attaching wearable electronic devices to a user.

BACKGROUND

Some electronic devices may be removably attached to a user. For example, a portable electronic device such as a smart watch can be attached to a user's wrist by joining free ends of a watch band together.

Some watch bands include a two-part clasp such as a tang-type buckling clasp or a snap-fit clasp. Other watch bands include a one-piece clasp (e.g., folding clasp) or an elasticated band. In many cases, these and other conventional watch bands may uncomfortably catch, pinch, and/or pull a user's hair or skin during use, attachment, or detachment. Moreover, conventional watch bands often require multiple steps and/or dexterity to attach or to detach from a user's wrist. A user may ignore these and other disadvantages of conventional watch bands since traditional wristwatches are typically removed and reattached relatively infrequently. However, the same user may be aggravated or inconvenienced with the task of regularly attaching and detaching a smart watch, or other portable electronic device, that may require regular recharging of internal batteries and/or regular connection to a data port of a separate electronic device.

Accordingly, there may be a present need for a watch band suitable for rapid, comfortable, and convenient attachment and detachment from a user's wrist.

SUMMARY

Embodiments described herein may relate to, include, or take the form of an attachment system for securing a portable electronic device to a wrist. The attachment system can include a sizing band and a retaining band, each independently secured to the portable electronic device via insertion of a securement end of each band into a channel within the housing of the portable electronic device. The sizing band can include a band-insertable end and an eyelet. The retaining band can include a concealment aperture having a greater width than the sizing band. To attach the portable electronic device to the wrist, the band-insertable end of the sizing band can be fed around the wrist and through the concealment aperture of the retaining band so that the two bands interlace to form a closed loop with the band-insertable end of the sizing band partially concealed from external view between the retaining band and the user's wrist. To detach the portable electronic device from the wrist, the band-insertable end of the sizing band can be drawn from the concealment aperture.

In some embodiments, a portion of the top surface of the sizing band may come into contact with the bottom surface of the retaining band upon insertion through the concealment aperture. In some examples, the retaining band can incorporate a guide bed to receive the inserted length of sizing band. In many cases, the guide bed may be longitudinally centered along the bottom surface of the retaining band. In addition, the guide bed may at least partially retain the inserted length of the sizing band in place behind the retaining band.

The retaining band can also include a post configured to insert within the eyelet of the sizing band. Upon insertion into the eyelet, the post can provide resistance to separation of the sizing and retaining band. In many cases, the post may be formed from metal and/or may include at least one surface finish configured to increase friction between the post and the sizing band.

For many embodiments described herein, the bands of the attachment system may be formed from a compliant material. For one example, the sizing and retaining bands can be formed from a fluoroelastomeric polymer having a Shore A durometer ranging from 60 to 80 and/or a tensile strength greater than 12 mega Pascal. Other embodiments may be formed from, or operate with bands formed from, compliant materials such as, but not necessarily limited to, plastic, rubber, leather, nylon, canvas or other fibrous, organic, polymeric, or synthetic materials.

Other aspects of embodiments described herein may relate to, include, or take the form of systems and/or methods for removably securing compliant bands to rigid housings. In one aspect, such a system can include a rigid housing with a band-retaining channel formed into and extending along a first external sidewall thereof. In some embodiments, the band-retaining channel may also extend through a second external sidewall of the rigid housing, such that the band-retaining channel forms an insertion aperture in the second sidewall. In these and related embodiments, one end of a complaint band (which may be either a sizing band or a retaining band) can be inserted into the insertion aperture, and thus into the band-retaining channel, by sliding the complaint band from one end of the channel to the other.

In many cases, the band-retaining channel may be tapered toward the first external sidewall such that the opening height of the channel in the first sidewall is shorter than the largest interior height of the channel. The taper of the band-retaining channel can increase a compliant band's resistance to pulling the band out of the channel, when a removal force is exerted perpendicular to the channel, without affecting the resistance to insertion or removal of the compliant band into or from the insertion aperture. In many embodiments, the channel-insertable portion of the compliant band may be tapered to follow the taper of the channel.

In some embodiments, the compliant band can also include a structural insert within the channel-insertable portion of the compliant band. The structural insert can be configured to increase the deformation resistance of the channel-insertable portion. In certain cases, a channel-insertable portion without a structural insert may deform in response to large pullout forces, undesirably drawing the complaint band from the channel and disconnecting the compliant band from the rigid housing. In these embodiments, a structural insert may substantially increase the deformation resistance of the channel-insertable portion, thus preventing the complaint band from being drawn from the channel in response to large pullout forces. In many embodiments, the structural insert is insert molded within the compliant band.

In still further embodiments, the compliant band can include a friction element configured to increase friction between the compliant band and the channel. The friction element may be included to prevent unintended displacement of the band within the channel.

Embodiments described herein may also relate to, include, or take the form of methods of forming a compliant band including the operations of molding a sizing band including at least a first insert end and at least one eyelet, disposing a first core member into the first end, molding a retaining band including at least a second insert end, and a receiving aperture sized to receive the first insert end, and an indentation sized to receive a depth of the sizing band, disposing a second core member into the second end, affixing a post to the retaining band between the receiving aperture and the second insert, and buffing sidewalls of the sizing band and the retaining band to remove flash.

Further embodiments described herein may also relate to, include, or take the form of a method of applying a surface finish to a metal part, such as a post. The method may include the operations of applying a first surface finish to the metal part to form grooves on the external surface of the metal part, and thereafter, applying a second surface finish to the metal part to reduce surface diffraction. In many examples, the second surface finish may be applied by bombarding the metal part with fine media.

BRIEF DESCRIPTION OF THE DRAWINGS

Reference will now be made to representative embodiments illustrated in the accompanying figures. It should be understood that the following descriptions are not intended to limit the disclosure to one preferred embodiment. To the contrary, each is intended to cover alternatives, modifications, and equivalents as may be included within the spirit and scope of the described embodiments as defined by the appended claims.

FIG. 1A depicts a top plan view of an example wearable device with a two-band attachment system for securing to a user's wrist.

FIG. 1B depicts a bottom plan view of the wearable device of FIG. 1A.

FIG. 10 depicts example operations of a method of affixing a post to a retaining band.

Figure 2A:
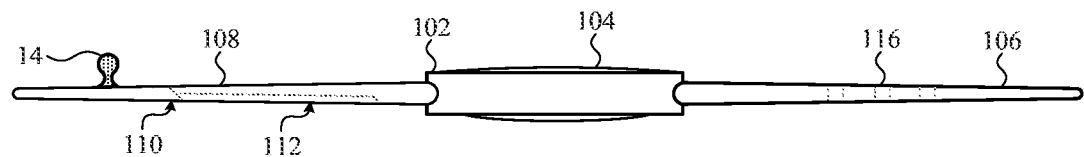
FIG. 2A depicts a side plan view of the wearable device and two-band attachment system of FIG. 1A in an open configuration.

The use of the same or similar reference numerals in different drawings indicates similar, related, or identical items. The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference for particular materials, material properties, proportions, dimensions, commonalities of similarly-illustrated elements, or any other characteristic, attribute, or property for any element illustrated in the accompanying figures.

DETAILED DESCRIPTION

Embodiments described herein relate to systems and methods for affixing an electronic device to an object and, more particularly, to mechanisms for removably attaching wearable electronic devices to a user. It should be appreciated that the various embodiments described herein, as well as functionality, operation, components, and capabilities thereof may be combined with other elements, embodiments, structures and the like, and so any physical, functional, or operational discussion of any element or feature is not intended to be limited solely to a particular embodiment to the exclusion of others.

Some portable electronic devices may be removably attached to a user. For example, a wearable device such as a smart watch can be attached to a user's wrist by joining free ends of a conventional watch band together. In other examples, a clasp or an elasticated band may be used to secure the wearable device.

However, in many cases, a wearable device may need to be regularly removed from the user. For example, many wearable devices include one or more internal batteries that require recharging from time to time. In other examples, a wearable device may require a physical connection to a separate electronic device, such as a personal computer, in order to receive updates or other data. In both examples, it is impractical for a user to continue wearing the device. Further, after the wearable device is recharged and/or the data transfer is complete, the user may reattach the wearable device.

In many cases, a wearable device may be removed and reattached more frequently than a traditional wristwatch. For example, a wearable device may be recharged once every few days, whereas a traditional wristwatch may be worn consistently for weeks or more at a time. The greater the frequency with which a wearable device is removed and reattached, the more a user may become frustrated with the time and/or dexterity required to remove and reattach a conventional two band watchband over and over again. Other conventional watch bands, such as clasps or elasticated bands, may uncomfortably catch, pinch, and/or pull a user's hair or skin with repeated removal and reattachment.

The inconvenience and/or discomfort associated with repeated removal and reattachment of a conventional watchband may contribute to a user discontinuing use of the wearable device, which may in turn bring about a customer retention problem for the manufacturer of the wearable device. In other examples, such as for wearable devices configured to collect health-related information (e.g., pulse rate, blood oxygen saturation, blood pressure, insulin levels, etc.) or to provide health-related notifications (e.g., prescription timing reminders, medical alerts, medical identification numbers, etc.), discontinued use of the wearable device may lead to more serious consequences such as health problems.

In other examples, some users may desire to replace conventional watch bands from time to time for personal reasons. However, conventional watch bands are typically secured with spring bars that insert into lugs extending from the watch body. Often, spring bars are delicate and small, and require either specialized tools or expertise in addition to considerable time to remove and reattach.

Accordingly, embodiments described herein relate to and include attachment systems suitable for rapid, comfortable, and convenient detachment and reattachment of a wearable device from a user's wrist. Other embodiments described herein relate to attachment systems configured for rapid detachment and reattachment of the system from an associated wearable device.

As one non-limiting example, certain embodiments may take the form of an attachment system for securing a wearable device to a wrist. The attachment system can include a sizing band and a retaining band, each independently secured to the wearable device housing.

The bands of the attachment system can be formed from a compliant material that is configured to easily contour to a user's wrist, while retaining stiffness sufficient to maintain the position and orientation of the wearable device on the user's wrist. These materials can support a looser attachment to the wrist, which, in many cases, can provide a more comfortable fit. More particularly, the more flexible the compliant material, the tighter the band should be secured to prevent the wearable device from sliding or otherwise displacing on the user's wrist. Suitable compliant materials may include plastic, rubber, leather, nylon, canvas or other fibrous, organic, polymeric, or synthetic materials.

In some embodiments, bands described herein and suitable for use with, or as a part of, an attachment system can be formed from a polymer such as a fluoroelastomeric polymer, having a Shore durometer selected for flexibility suitable for easily contouring to a user's wrists and selected for having sufficient stiffness to maintain support of the electronic device when attached to a user's wrist. For example, bands in certain embodiments may have a Shore A durometer ranging from 60 to 80 and/or a tensile strength greater than 12 MPa.

In other embodiments, a fluoroelastomeric polymer (or other suitable polymer) can be doped or treated with one or more other materials. For example, the polymer can be doped with an agent configured to provide the polymer with a selected color, odor, taste, hardness, elasticity, stiffness, reflectivity, refractive pattern, texture and so on. In other examples, the doping agent can confer other properties to the fluoroelastomeric polymer including, but not necessarily limited to, electrical conductivity and/or insulating properties, magnetic and/or diamagnetic properties, chemical resistance and/or reactivity properties, infrared and/or ultraviolet light absorption and/or reflectivity properties, visible light absorption and/or reflectivity properties, antimicrobial and/or antiviral properties, oleophobic and/or hydrophobic properties, thermal absorption properties, pest repellant properties, colorfast and/or anti-fade properties, deodorant properties, antistatic properties, medicinal properties, liquid exposure reactivity properties, low and/or high friction properties, hypoallergenic properties, and so on.

In some embodiments, one or more doping agents may be used. In further embodiments, the doping agents associated with one area of the bands may be different from the doping agents associated with another area of the bands. In one example, a band may have a low friction dopant added to the portion of a band that faces a user's wrist (e.g., bottom surface) while having a high reflectivity dopant added to the portion of the band that faces outwardly (e.g., top surface).

Other embodiments described herein include configurations in which the bands of an attachment system are configured to be removably coupled to the housing of the wearable device.

Generally, a wearable device housing may be rigid and can be configured to provide structural support and impact resistance for electronic or mechanical components contained therein. A rigid housing is not necessarily required for all embodiments and, in some examples, the wearable device housing may be flexible. Furthermore, although wearable device housings are typically formed to take a rectangular shape, this is not required and other shapes are possible. For example, certain housings may take a circular shape.

In one embodiment, a rectangular wearable device housing can have a top surface, a bottom surface, and four sidewalls connecting the two. The wearable device housing can have two band-retaining channels extending into opposite sidewalls of the housing. A first band-retaining channel can be formed into a top sidewall and a second band-retaining channel can be formed into a bottom sidewall of the housing. In many embodiments, each band-retaining channel may also extend through another sidewall of the housing that is adjacent to the first sidewall so as to form an insertion aperture in the other sidewall.

More specifically, in one example, both the first and second first band-retaining channels can also extend through the right and left sidewalls of the housing. In this manner, each adjacent sidewall (in the example, the left and right sidewalls) includes two insertion apertures. The right sidewall may include a first insertion aperture associated with the first band-retaining channel and a second insertion aperture associated with the second band-retaining channel. Similarly, the left sidewall may also have two insertion apertures each associated with one of the band-retaining channels. In an alternate phrasing of this one example, each band-retaining channel may be associated with two insertion apertures.

Each band can include an end portion (also called a "channel-insertable portion" or a "securement end") that is configured to be inserted into a respective insertion aperture. Accordingly, the insertion aperture(s) can be adapted and sized to receive the channel-insertable portion of one of the bands of the attachment system. In an alternate phrasing of this one example, the channel-insertable portions of the band can be inserted in the band-retaining channels through an insertion aperture.

In other embodiments, each band-retaining channel may be associated with a single insertion aperture. For example, the first band-retaining channel can include an insertion aperture in the right sidewall of the housing and the second band-retaining channel may include an insertion aperture in the left sidewall of the housing. In this example, a sizing band may be inserted into the right insertion aperture and a retaining band may be inserted into the left insertion aperture. Thereafter, the sizing band can be retained by the first band-retaining channel and the retaining band can be the second band-retaining channel.

In these examples, each band-retaining channel formed within the housing can be tapered toward an external sidewall such that the opening of the channel is shorter than the largest interior height of that channel. Typically, a channel is formed into the sidewall that is parallel to the insertion motion of the band, but not necessarily. Correspondingly, the channel-insertable portions of the bands can be tapered to follow the taper of the band-retaining channel.

In this manner, to attach a band to the housing, the channel-insertable portion of the selected band is inserted into the insertion aperture and slid into the band-retaining channel. In this manner, the channel-insertable portions of the selected band can secure the band to the wearable device.

In many embodiments, the channel-insertable portion may include a detent to interlock with a recess within the band-retaining channel. The detent can prevent unintended separation of the band and the housing. Once both the sizing and retaining band are inserted into respective insertion apertures and, thus, into respective band-retaining channels, the free ends of the sizing and retaining band can be joined around a user's wrist to form a closed loop.

In further embodiments, the bands can also include a structural insert within the channel-insertable portions. The structural insert can be configured to increase the deformation resistance of the channel-insertable portion and also to provide structural support for the detent that secures the bands to the channel of the wearable device housing. More specifically, in certain embodiments the channel-insertable portion may deform in response to sufficient shear forces, eventually drawing the band from the channel and disconnecting the band from the wearable device housing. In these embodiments, the structural insert may substantially increase the pullout resistance of the channel-insertable portion. In many examples the structural insert can be insert molded into the channel-insertable portion of the band, or formed as part of molding the band itself. In other examples, a structural insert can include a shelf portion or a flange portion that can be over-molded by the band. In these examples, a portion of the structural insert may form a substantially continuous surface with the band.

Although many embodiments described herein may refer to a band that is insertable into a channel of the housing, such a connection mechanism is not necessarily required for all embodiments. For example, bands of attachment mechanisms described herein may be secured to the housing of a wearable device using other means. For example, bands can snap, clip, and/or contour around the wearable device housing. In other examples other mechanical fastening mechanisms such as magnets may be used. In further examples, permanent fastening mechanisms can be used. For example, some attachment systems can be secured to a wearable device housing with a permanent adhesive.

A sizing band can include a channel-insertable portion, band-insertable end and at least one eyelet. In many examples, more than one eyelet can be formed within the sizing band, distributed at uniform intervals across the length of the band. In other examples the distribution of the eyelets may be non-uniform. For example, the eyelets may be distributed in a logarithmic or exponential distribution, or any other suitable distribution, such that eyelets suitable for wrists of large size are distributed farther apart than eyelets suitable for wrists of small size. In these embodiments, the distribution of the eyelets may be based, at least in part, on the average wrist size of the expected user. Some embodiments need not follow any mathematical distribution.

A retaining band can include a concealment aperture having a greater width than the sizing band. In other embodiments, the concealment aperture may be formed to have a width approximately equal to the width of the sizing band. The concealment aperture may be configured to receive the sizing band through it, thereby concealing a portion of the sizing band between the retaining band and the user's wrist. In many embodiments, the concealment aperture is formed to have the shape of a rounded rectangle (e.g., "pill" shaped or "lozenge" shaped), although this shape is not required.

In many examples, the retaining band can also include a post (e.g., fastening pin, retaining post, etc.) configured to be inserted in a selected eyelet of the sizing band. Upon insertion into the eyelet, the post can resist unintended separation of the sizing and retaining band. In many cases, the post may be formed from metal, ceramic, or plastic and/or may include at least one surface finish configured to increase friction between the post and the sizing band.

In many examples, the retaining band can also incorporate a recessed guide bed to receive and guide the inserted length of sizing band. In many cases, the guide bed can be longitudinally centered along the bottom surface of the retaining band. For these embodiments, the combined thickness of the overlapping portions of the sizing and retaining band may be reduced. In addition, the guide bed may at least partially retain the inserted length of the sizing band in place behind the retaining band.

To attach the portable electronic device around a limb, the end of the sizing band can be fed around the limb and through the concealment aperture of the retaining band so that the two bands interlace to form a closed loop. In many examples, the material selected for each band may have a low coefficient of friction such that the band-insertable end of the sizing band can slide into the concealment aperture and against or past the user's skin without substantial resistance that might cause discomfort to the user. After insertion of the band-insertable end through the concealment aperture, the user can apply pressure to the sizing band to push the sizing band further along the guide bed of the retaining band in order to adjust the tightness against the limb. When the desirable tightness is reached, the user can push the post of the retaining band through the most proximate sizing eyelet of the sizing band. In many embodiments, the process of inserting the band-insertable end and tightening the sizing and retaining bands may be comfortably and conveniently accomplished with the user's free hand.

To detach the portable electronic device from the limb, the post can be withdrawn from the sizing eyelet and the band-insertable end of the sizing band can be drawn from the concealment aperture. The process of removing the band-insertable end and loosening the sizing and retaining bands may be comfortably and conveniently accomplished with the user's free hand.

FIG. 1A depicts a top plan view of an example wearable device with a two-band attachment system for securing to a user's wrist. In the illustrated embodiment, the wearable device 100 is implemented as a portable electronic device that is adapted to be worn by a user. Other embodiments can implement the wearable device differently. For example, the wearable device can be a smart phone, a gaming device, a digital music player, a sports accessory device, a medical device, a device that provides time and/or weather information, a health assistant, and other types of electronic device suitable for attaching to a user.

The wearable device 100 includes a housing 102 at least partially surrounding a display 104. In many examples, the display 104 may incorporate an input device configured to receive touch input, force input, and the like. The wearable device 100 may also include one or more buttons or input devices (not shown). The housing 102 can form an outer surface or partial outer surface and protective case for the internal components of the wearable device 100. In the illustrated embodiment, the housing 102 is formed into a substantially rectangular shape, although this configuration is not required.

The housing 102 can be formed of one or more components operably connected together, such as a front piece and a back piece or a top clamshell and a bottom clamshell. Alternatively, the housing 102 can be formed of a single piece (e.g., uniform body or unibody) operably connected to the display 104.

The display 104 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. A button (not shown) might take the form of a home button, which may be a mechanical button, a soft button (e.g., a button that does not physically move but still accepts inputs), an icon or image on the display 104 or on an input region, and so on. Other buttons or mechanisms can be used as input/output devices, such as a speaker, a microphone, an on/off button, a mute button, rotary input, switches, or a sleep button.

The wearable device 100 can be permanently or removably attached to a two-part band system including a sizing band 106 and a retaining band 108. The sizing band 106 may be sized to insert through a concealment aperture 110 that is formed within the retaining band 108. As shown, and in many embodiments, the concealment aperture 110 may be substantially lozenge shaped. The height of the concealment aperture 110 may vary from embodiment to embodiment, but in some embodiments the minimum height of the concealment aperture 110 is related to the thickness of the sizing band 106. For example, if the sizing band 106 is thicker than the height of the concealment aperture 110, the user may find it inconvenient to feed the sizing band 106 through the concealment aperture 110.

After insertion through the concealment aperture 110, the sizing band 106 can slide along a guide bed 112 that is formed in the bottom surface of the retaining band 108 (see, e.g., FIG. 1B). The guide bed 112 may guide the sizing band 106 and prevent the sizing band 106, once inserted, from displacing side to side.

The size and/or proportions of the guide bed 112 can vary from embodiment to embodiment. For example, in certain embodiments, the guide bed 112 can be wider than the sizing band 106 by a selected amount. In other examples, the depth of the guide bed 112 can vary along the length of the guide bed.

In other embodiments, the guide bed 112 can be configured to extend into half of the thickness of the retaining band 108. In other embodiments, the guide bed 112 can be configured to extend into a quarter of the thickness of the retaining band 108. In other examples, the guide bed 112 can extend into the retaining band 108 by another depth.

In many cases, the depth of the guide bed 112 can affect the rigidity of the retaining band 108. For example, a retaining band with a guide bed extending into half of the retaining band's thickness may be less rigid than a retaining band with a guide bed extending into a quarter of the retaining band's thickness. In other words, the flexibility of certain embodiments of the retaining band can be affected, at least in part, by selecting the depth of the guide bed. Accordingly, certain embodiments can select a target flexibility for the retaining band by selecting a specific depth of the guide bed. In some embodiments, the target flexibility of the retaining band 108 (with the guide bed) may be selected to be substantially equal to the flexibility of the sizing band 106. In this manner, both bands may have substantially the same flexibility.

Although the embodiments described above relating to the size and/or proportion of the guide bed 112 are discussed with respect to depth, one can appreciate that varying other dimensions of the guide bed 112 can also affect the flexibility of the retaining band 108.

The retaining band 108 may also include a post 114 that is configured to be inserted within a sizing eyelet 116 of the sizing band 106. In many embodiments, the sizing band 106 may include more than one sizing eyelet. For example, as illustrated, the sizing band 106 includes three sizing eyelets. Although the sizing eyelets are illustrated as circular apertures within the sizing band 106, such a shape is not required. For example, in other embodiments, the sizing eyelet 116 may take a rectangular or oval shape. Furthermore, although the three sizing eyelets of the sizing band 106 are shown as evenly distributed along the length of the sizing band 106, such a configuration is not required.

FIG. 2A depicts a side plan view of the wearable device and two-band attachment system of FIG. 1A in an open configuration. As shown the sizing band 106 and the retaining band 108 are substantially flat, although this configuration is not required. For example, the sizing band 106 and the retaining band 108 may be formed in a substantially curved shape.

As shown the post 114 of the retaining band 108 may extend from a top surface of the retaining band 108 a certain distance. In certain embodiments, the post 114 can be insert molded into the retaining band 108. In other examples, the post 114 can be secured to the retaining band 108 with a fastener such as a screw or bolt. In many embodiments, the post 114 may be permanently fastened to the retaining band 108, although this is not required. For example, if the post 114 is attached to the retaining band 108 with a fastener, a permanent adhesive may be used to make the connection permanent. Alternatively, if a permanent adhesive is not used, the post 114 can be removed, replaced, or otherwise disconnected from the retaining band 108 by removing the fastener.

As illustrated, the post 114 includes a head portion and a neck portion that is thinner than the head portion. As shown, the head portion of the post 114 may be substantially spherical, although this configuration is not required. For example in other embodiments, the head portion may take another shape that is thicker than the neck portion. For example, the post 114 may be substantially rectangular and may include a substantially rectangular head portion and neck portion.

Figure 2B:
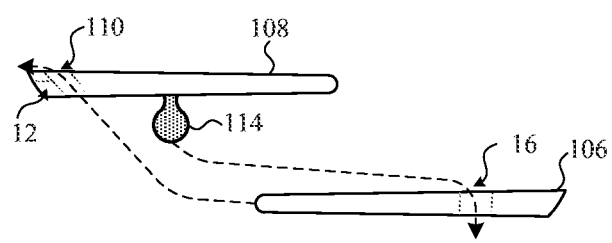
FIG. 2B depicts a detail side view of the relative closure paths of the two bands of the attachment system of FIG. 1A in an open configuration.
Figure 2C:
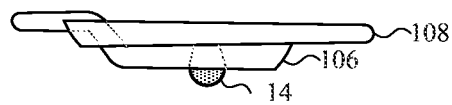
FIG. 2C depicts a detail side view of the relative closure paths of the two bands of the attachment system of FIG. 1A in a closed configuration.
Figure 2D:
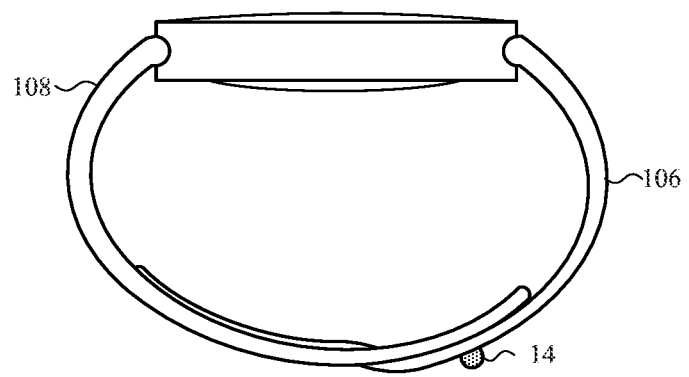
FIG. 2D depicts a side plan view of the wearable device of FIG. 1A in a closed configuration.

As described above, the two-band attachment system can be secured to a user by inserting the sizing band 106 into the concealment aperture 110 and into the guide bed 112 while thereafter or simultaneously inserting the post 114 into a sizing eyelet 116 (see, e.g., FIG. 2B). Once inserted, the sizing band 106 may rest within the guide bed 112, for example as shown in FIGS. 2C-2D.

Figure 3A:
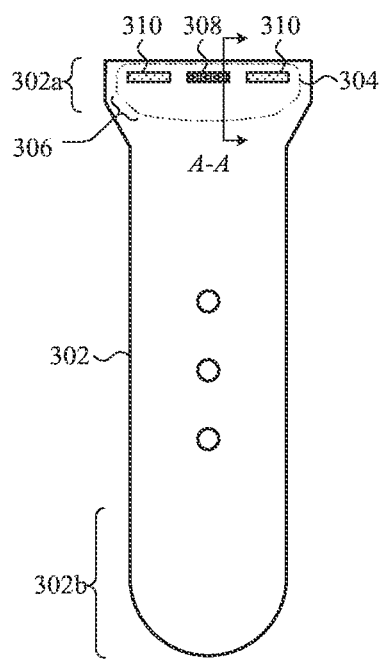
FIG. 3A depicts a top plan view of one band of a two-band attachment system, showing a structural insert.

FIG. 3A depicts a top plan view of a sizing band 302 of a two-band attachment system showing a structural insert. The sizing band 302 may have a channel-insertable portion 302a that is configured to be inserted into a channel (not shown) of a wearable device housing. Opposite the channel-insertable portion 302a may be a band-insertable portion 302b (also called an "insert portion"). As with other embodiments described herein, the band-insertable portion 302b can be configured to be inserted into a concealment aperture (not shown) of a retaining band (not shown).

The channel-insertable portion 302a can include a structural insert 304, illustrated in phantom. The structural insert 304 can provide structural and mechanical stability to the channel-insertable portion 302a. For example, the structural insert 304 can increase the channel-insertable portion's resistance to bending, warping, and/or deformation. In many embodiments the structural insert 304 may be formed from a material that has a greater Shore hardness than the material selected for the sizing band 302. For example, the structural insert 304 can be formed from metal. In another embodiment, the structural insert 304 may be formed from a plastic or glass material. In still further embodiments, the structural insert 304 can be an integrated part of the channel-insertable portion 302a. For example, a strengthening doping agent may be used in the channel-insertable portion 302a that confers the channel-insertable portion 302a with greater hardness than the rest of the sizing band 302.

In some embodiments, and as illustrated, the sizing band 302 can taper inward from the channel-insertable portion 302a to a body portion, although such a configuration is not required. For example, the channel-insertable portion 302a may be the same width as the body portion of the sizing band 302 in some embodiments. In other embodiments, the channel-insertable portion 302a may be thinner than the body portion.

In many embodiments, the structural insert 304 may be insert molded into the channel-insertable portion 302a.

The structural insert 304 can also include a substantially rounded profile. For example, the structural insert 304 can include a smooth portion 306 that extends toward the length of the sizing band 302. The smoothness of the smooth portion 306 can reduce localized stress points that might result from sharp corners of a structural insert 304. More particularly, a structural insert 304 having sharp corners or edges may create localized stress points within the sizing band 302 when the sizing band 302 is bent or deformed during normal use.

Although the smooth portion 306 is illustrated and identified in FIG. 3A, other surfaces and corners of the structural insert 304 can be curved or softened to prevent localized stress points. In certain embodiments, the structural insert 304 may not have any sharp corners or edges.

The channel-insertable portion 302a may also include a retractable detent 308. The retractable detent 308 can be positioned in the center of the channel-insertable portion 302a, as illustrated, although this configuration is not required. For example, in certain embodiments, the retractable detent 308 can be positioned closer to one edge of the channel-insertable portion 302a. In other embodiments, more than one retractable detent can be used.

The channel-insertable portion 302a may also include one or more friction pads 310. The friction pads 310 may be configured to provide a high friction relationship between the channel-insertable portion 302a and the interior of the channel of the housing (not shown). In this manner, the friction pads prevent or reduce unexpected or undesired translation of the channel-insertable portion 302a within the channel (not shown). In some embodiments, the friction pads 310 may be co-molded with the sizing band 302. In other embodiments, the friction pads 310 can be insert molded in the sizing band 302, inserted after molding of sizing band 302, or positioned using any suitable method. In many examples, the friction pads 310 may be formed from a different material from the sizing band 302, although this is not required. For example the friction pads 310 may be formed from the same material as sizing band 302, but may take a different surface feature. For example, the sizing band 302 may be molded to have a substantially continuous (and smooth) outer surface, whereas the friction pads may be formed as a plurality of small dimples.

Figure 3B:
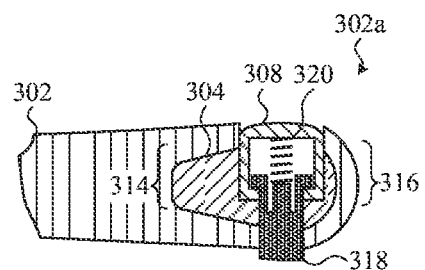
FIG. 3B depicts a side cross-section view of the band of FIG. 3A taken along section A-A, showing a retractable detent within the structural insert.

FIG. 3B depicts a side cross-section view of the band of FIG. 3A taken along section A-A, showing the retractable detent 308 within the structural insert 304. In these embodiments, the structural insert 304 may include an aperture or other structure for supporting the structural insert. The retractable detent 308 may extend a certain distance from the top surface of the channel-insertable portion 302a. In other embodiments, the retractable detent 308 may be disposed so as to be substantially flush with the top surface of the channel-insertable portion 302a.

Also shown in the illustrated cross-section are two portions of the structural insert 304, identified as a front smooth portion 314 and a back smooth portion 316. The front smooth portion 314 may be implemented as a taper extending into the length of the sizing band 302. The front smooth portion 314 may also have substantially rounded edges. The back smooth portion 316 may be implemented as a substantially rounded surface. As noted with respect to other smoothed surfaces of the structural insert 304, the front and back smooth portions 314, 316 may prevent concentration of stress upon bending or deflection of the sizing band 302.

Also shown in the cross-section illustrated in FIG. 3B is a foot portion 318. The foot portion 318 may extend a certain distance from the bottom surface of the channel-insertable portion 302*a* and may be operably associated with the retractable detent 308. In many examples, the foot portion 318 may be positioned opposite the retractable detent 308. For example, as illustrated the foot portion 318 is directly below the retractable detent 308. In these and related embodiments, the foot portion 318 can interlock with a portion of the retractable detent 308. As illustrated, the foot portion can include a flanged portion that interlocks with a corresponding flange portion of the retractable detent 308.

In further examples, the foot portion 318 may be mechanically coupled to the retractable detent 308 by a spring member 320. The spring member 320 can be any suitable type of springing or elastic member such as a metal spring. In other embodiments, the spring member 320 may be one or more strands of elastic material. In some embodiments, the strands of elastic material may be formed from the same material and/or may be coupled to the material selected for the sizing band 302.

The spring member 320 may be positioned between the foot portion 318 and the retractable detent 308 such that when the foot portion 318 is pushed or otherwise forced into the body of the channel-insertable portion 302*a*, the additional compression applied to the spring member 320 may cause the retractable detent 308 to exhibit an outward force on the upper surface of the interior sidewall of the band retaining channel.

Figure 3C:
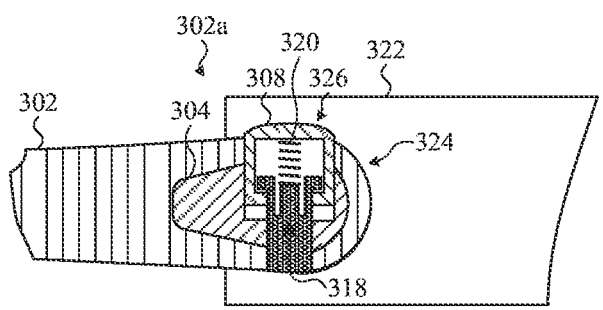
FIG. 3C depicts a side cross-section view of the band of FIG. 3A taken along section A-A, showing the band inserted within a tapered channel of a rigid housing.
Figure 3D:
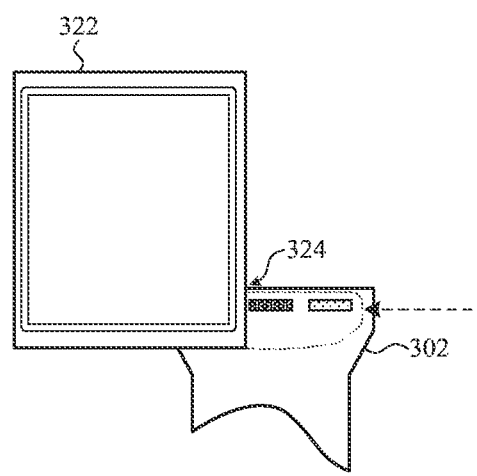
FIG. 3D depicts a top plan view of the band of FIG. 3A being inserted into a band-retaining channel.

More specifically, with reference to FIG. 3C, when the channel-insertable portion 302*a* is inserted into a channel 324 of a device housing 322, the foot portion 318 is pushed inward (relative to the channel-insertable portion 302*a*) by the bottom interior sidewall of the channel 324. As noted above, when the foot portion 318 is pushed into the body of the channel-insertable portion 302*a*, the additional tension imparted to the spring member 320 is transferred to the retractable detent 308. As the channel-insertable portion 302*a* is slid further into the channel 324 (see, e.g., FIG. 3D), the retractable detent 308 eventually may be positioned below a detent recess 326 that is formed within the top sidewall of the channel 324. Once positioned below the detent recess 326, the retractable detent 308 may, as a result of the force of the spring member 320, thrust upward to occupy the detent recess 326. In this manner, the retractable detent 308 provides a temporary locking mechanism that secures the sizing band 302 within the channel 324.

Although the illustrated embodiment(s) includes a single detent and a single detent recess, one may appreciate that certain embodiments may include more than one detent and more than one complementary detent recesses. For example, in certain embodiments, two detents and two detent recess may be used. In such embodiments, the detent recesses may be positioned at different angles with respect to the insertion axis.

Other embodiments described herein relate to a guide bed formed within a bottom surface of a retaining band. For example, FIG. 4A-4D depict a top plan view of a retaining band 400 of a two-band attachment system showing a concealment aperture 402 and a post 404.

As with the sizing band embodiment described with respect with FIGS. 3A-3D, the retaining band 400 may also include a structural insert, a retractable detent, and one or more friction pads disposed within or as a part of a channel-insertable portion, configured for insertion into a band-retaining channel of a housing. Furthermore, one may appreciate that the various embodiments described above relating to coupling bands to housings may equally apply to both a sizing band and a retaining band, and that the embodiments, features, and elements described in reference to FIGS. 3A-3D should be equally considered applicable to FIGS. 4A-4F.

As noted with respect to further embodiments described herein, the concealment aperture 402 of the retaining band 400 may be positioned and sized to receive a portion of a sizing band 410 (see, e.g., FIGS. 4D-4F) of the attachment system. Similarly, the post 404 may be configured to be received within an eyelet of the sizing band (see, e.g., FIG. 4D-4F).

Figure 4A:
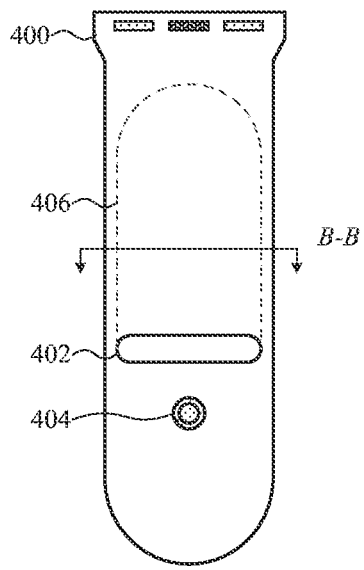
FIG. 4A depicts a top plan view of one band of a two-band attachment system showing a concealment aperture and a post.
Figure 4B:
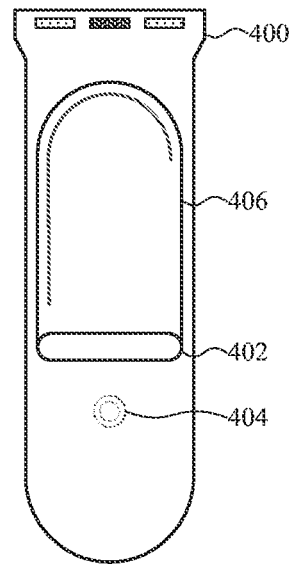
FIG. 4B depicts a bottom plan view of the band of FIG. 4A showing a guide bed formed into the bottom surface of the band.
Figure 4C:
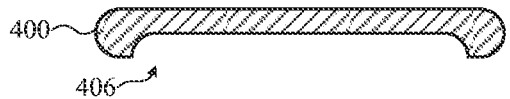
FIG. 4C depicts a side cross-section view of the band of FIG. 4A taken along section B-B showing the guide bed of FIGS. 4A-4B formed into the bottom surface of the band
Figure 4D:
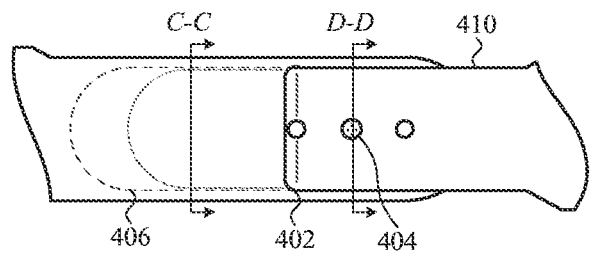
FIG. 4D depicts a top plan view of the two-band attachment system of FIG. 4A, shown in a closed configuration.
Figure 4E:
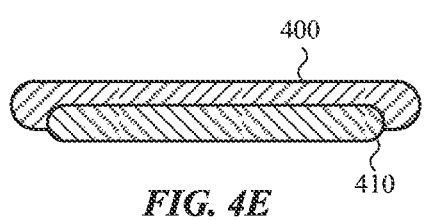
FIG. 4E depicts a side cross-section view of the two-band attachment system of FIG. 4D taken along section C-C showing one band end occupying a portion of the guide bed shown in FIGS. 4A-4D.
Figure 4F:
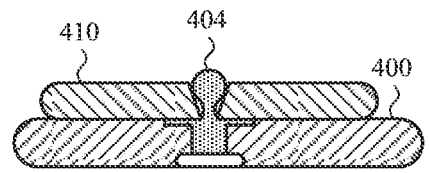
FIG. 4F depicts a side cross-section view of the two-band attachment system of FIG. 4D taken along section D-D showing the post of FIG. 4D inserted within an eyelet.

Also illustrated by FIGS. 4A-4D is a guide bed 406 that is formed, recessed, into the bottom surface of the retaining band 400. In many embodiments, the guide bed 406 may be adapted to receive an inserted length of a sizing band. In many cases, and as illustrated, the guide bed 406 may be longitudinally centered along the bottom surface of the retaining band 400. In addition, the guide bed 406 may at least partially retain an inserted length of the sizing band 410 in place behind the retaining band 400. FIG. 4D depicts a top plan view of the two-band attachment system of FIG. 4A, shown in a closed configuration, with the band-insertable portion of the sizing band 410 received through the concealment aperture 402 into the guide bed 406. FIG. 4E depicts a side cross-section view of the two-band attachment system of FIG. 4D taken along section C-C showing the sizing band 410 below the retaining band 400, partially received within the guide bed 406. FIG. 4F depicts a side cross-section view of the two-band attachment system of FIG. 4D taken along section D-D showing the post 404 received through a sizing eyelet of the sizing band 410, which in this cross section is positioned above the retaining band 400.

In other embodiments, the guide bed 406 may be formed as a pocket within the retaining band 400.

Figure 5A:
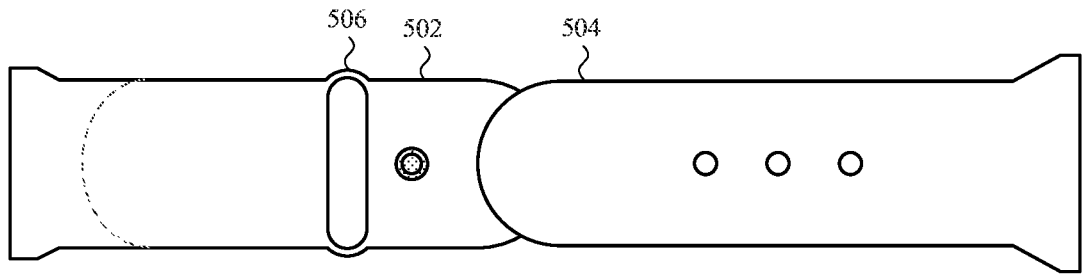
FIG. 5A depicts a top plan view of another embodiment of a two-band attachment system.

Many embodiments described herein, such as those shown in FIG. 1A and FIG. 4A relate to a retaining band with a concealment aperture that is fully contained within the width of the retaining band. However, in other embodiments, such as shown in FIG. 5A, the concealment aperture 506 need not necessarily be fully contained within the width of the retaining band 502. In the illustrated embodiment, the retaining band 502 and the sizing band 504 may share the same width.

Figure 5B:
FIG. 5B depicts a side view of another embodiment of a two-band attachment system.
Figure 5C:
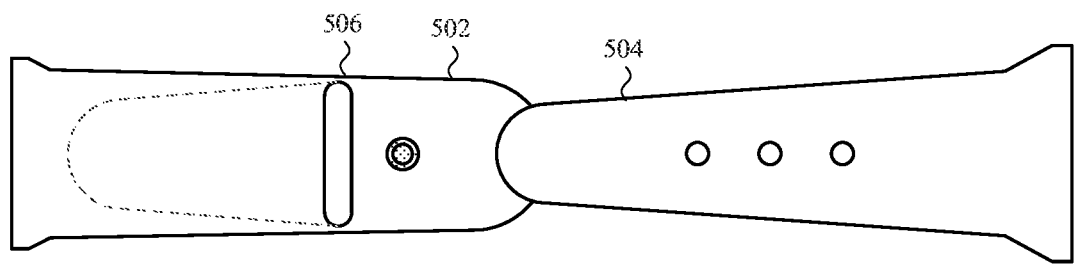
FIG. 5C depicts a top plan view of another embodiment of a two-band attachment system.

In another embodiment, such as shown in FIG. 5B, the retaining band 502 need not necessarily be substantially flat. For example, the retaining band 502 can follow a stair step pattern across the concealment aperture 506 in order to facilitate acceptance of the band-insertable end of the sizing band 504. In another embodiment, such as shown in FIG. 5C, the sizing band 504 need not necessarily be substantially rectangular. For example, the sizing band 504 can taper from the channel-insertion end to the band-insertable end such that the band-insertable end has a smaller width than the channel-insertion end.

Figure 5D:
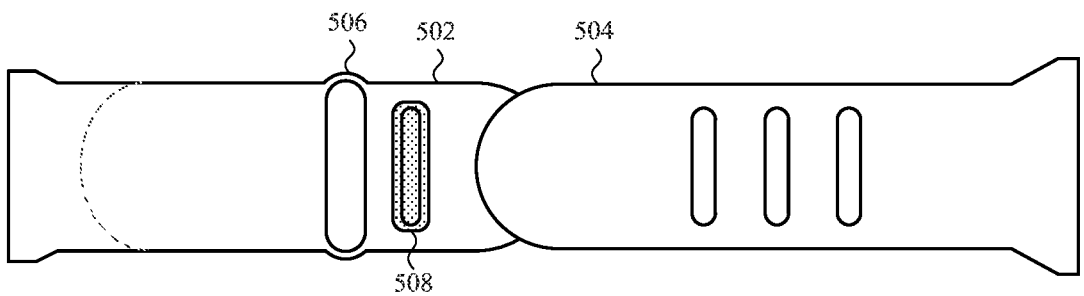
FIG. 5D depicts a top plan view of another embodiment of a two-band attachment system.

In still further embodiments, such as shown in FIG. 5D, the post 508 of the retaining band 502 may take a substantially rectangular shape. Correspondingly, the eyelets of the sizing band 504 may also take a substantially rectangular shape.

Figure 6A:
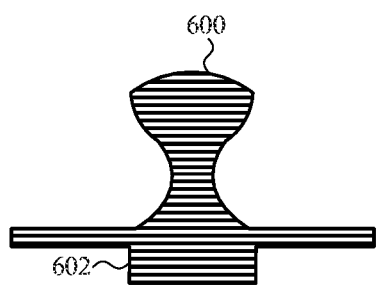
FIG. 6A depicts a side plan view of one example post finished with a first surface finish.

FIG. 6A depicts a side plan view of one example post finished with a first surface finish. In some embodiments a post 600 may be formed from metal and may be configured to be attached to a retaining band of an attachment system, such as the attachment systems described above. In the illustrated example, the post 600 can take a flattened spherical shape; in other embodiments, the post 600 can take a substantially spherical shape as shown In some examples, the post 600 can include threading 602 to receive a fastener such as a screw 606 as shown in the exploded view shown in FIG. 6C. Prior to attachment to the retaining band, the post 600 may undergo one or more surface treatments. For example, certain embodiments may require or desire a particular coefficient of friction between the post 600 and a corresponding eyelet within a sizing band. In other embodiments, a surface treatment may be applied for aesthetic reasons.

Figure 6B:
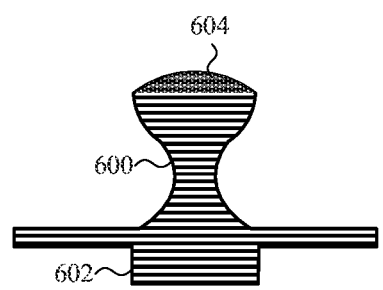
FIG. 6B depicts a side plan view of one example post finished with a first and second surface finish.
Figure 6C:
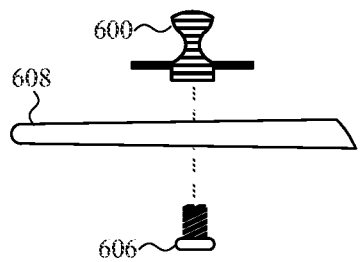
FIG. 6C depicts an exploded view side view of a band having a post.
Figure 6D:
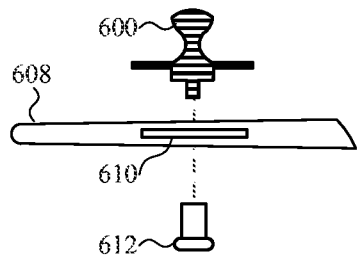
FIG. 6D depicts an exploded view side view of another band having a post.

In other examples, such as depicted in FIG. 6D, a post 600 can be affixed to a retaining band 608 with a snap fit or press fit. For example, an extended portion of the post 600 can be press fit into a base 612. In many embodiments, the base 612 may be formed from the same material as the post 600 but this is not required. In other examples the base 612 may undergo the same two-step finishing process as the post 600, although this is not required.

In further embodiments, the post can be secured to the retaining band 608 in a two-part press fit process. For example, such as depicted in FIG. 6D, a washer 610 can be insert molded into retaining band 608. Thereafter, an extended portion of the post 600 can be press fitted into a base 612 around the washer 610. In another non-limiting embodiment, the post 600 and base 612 can be press fitted against the washer 610 at the same time the post 600 is press fit into the base 612. In this manner, the retention strength between attachment between the post 600 and the retaining band 608 may be enhanced. For example, an extended portion of the post 600 can include a flange (not shown) that is configured to insert within a portion of the base 612. In these examples, the extended portion of the base 612 is inserted through the washer 610 into the base 612.

In one embodiment, the surface treatment can impart a latitudinal grading to the post 600. More specifically, a plurality of adjacent individual grooves may be cut, etched, ablated, and/or formed into the post 600. When viewed from the side, such as the side view shown in FIG. 6A, the plurality of adjacent individual grooves may extend from left to right. When viewed from the top down (not shown), the plurality of adjacent individual grooves may appear as a series of concentric circles. If the grooves are formed to a particularly small width (e.g., microns) the visual effect of the plurality may be similar to the visual effect of the readable surface of a Compact Disk (hereinafter "CD finish"). More particularly, when the post 600 is rotated, light refracted from the treated surface may appear to flare out from the midpoint or origin of the grooves. In certain embodiments, the CD finish can be applied by lathing, laser etching, laser ablation, or chemical etching.

However, in certain embodiments, the visual effects conferred by certain surface treatments may not necessarily appear as desired for posts of particular size. For example, a CD finish such as that described with respect to FIG. 6A, may result in substantial diffraction of light, leading to undesirable 'rainbow' effect. Accordingly, some embodiments, may apply a second surface finishing technique to the post so as to alter the visual characteristics of the first surface finishing technique. For example, as shown in FIG. 6B, a second surface finish 604 can be applied over the first surface finish of the post 600. As illustrated, the second surface finish 604 is only applied to the head portion of the post, but one may appreciate that the second surface finish can be applied elsewhere. In other embodiments, the second surface finish 604 can be applied to the entirety of the post 600, to the neck portion of the post 600, or to an arbitrary portion of the post 600.

In one embodiment, the second surface finish may be applied by blasting with a media of selected grit. In many examples, the media selected for blasting may have an average diameter smaller than the width of the grooves of the CD finish, but this is not required for all embodiments. For example, in other embodiments, the average diameter of the blast media may be greater than the average width of the grooves.

In this specific example, the blast media selected for the second surface treatment may generally soften the reflective properties imparted by the first surface treatment. To continue the CD finish example, a blast media can be selected so as to reduce the rainbow diffraction effect.

In other embodiments, a second surface finish may not necessarily be required. For example, a CD finish may be applied in such a way so as to prevent the undesirable rainbow effect.

Figure 7:
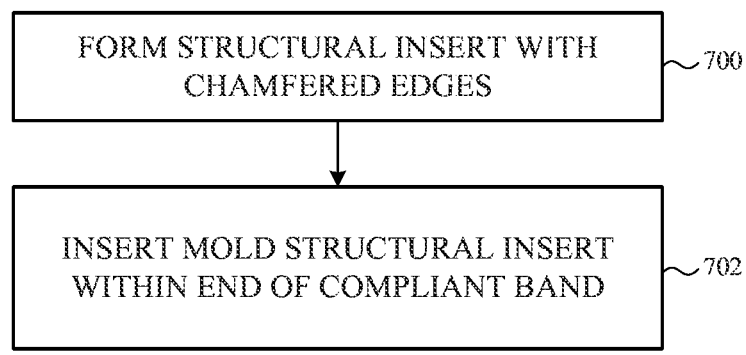
FIG. 7 depicts example operations of a method of insert molding a structural insert into a compliant band.

FIG. 7 depicts example operations of a method of insert molding a structural insert into a compliant band. The method may begin at 700 in which a structural insert is formed having chamfered, or otherwise smoothed, edges. The edges of the structural insert can be chamfered or smoothed using any number of suitable processes such as tumble finishing. Once the structural insert is formed, it may be insert molded into an end portion of a band such as a retaining band or a sizing band at operation 702. The band can be molded using any number of suitable processes such as injection molding, compression molding, or transfer molding.

Figure 8:
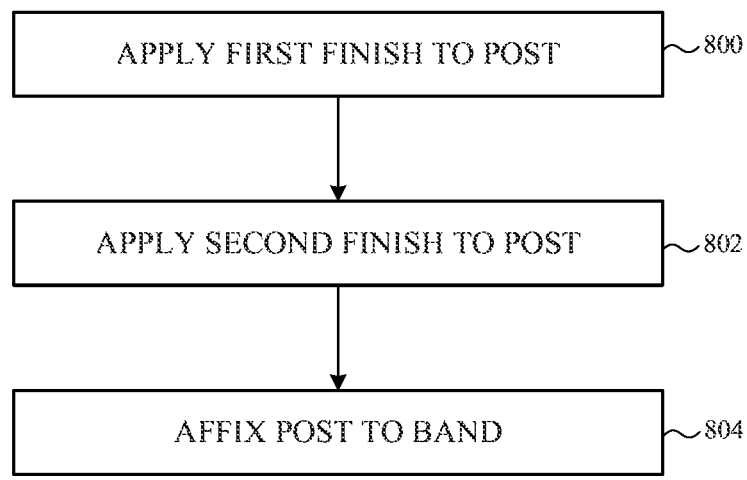
FIG. 8 depicts example operations of a method of using a second surface finishing technique to reduce surface diffraction resulting from a first surface finishing technique.

FIG. 8 depicts example operations of a method of using a second surface finishing technique to reduce surface diffraction resulting from a first surface finishing technique. The method can begin at operation 800, in which a first surface finish is applied to a post selected for attachment to a retaining band. As described above, the first surface finish may be a CD finish. Thereafter at operation 802, a second surface finish may be applied to the post. For example, the post may be subjected to blast media to smooth or otherwise augment the surface finish provide in the first operation. In certain embodiments, the blast media may be formed from microbeads of ceramic materials, having a diameter average on the micrometer scale. For example, in certain embodiments, the blast media may be made from zirconia. In other embodiments other blast media may be used.

In some embodiments, the operation 802 may be applied only to a portion of the post. For example, as shown in FIG. 6B, operation 802 may only apply the second surface finish to a head portion of the post. In other examples, the operation 802 can apply the second surface finish to another portion of the post.

Finally at operation 804, the post may be affixed to a retaining band. The post can be affixed to the band in any number of suitable ways. For example, in a first embodiment, the band may be adhered to the band by connection with a fastener such as a screw. In these embodiments, an adhesive may be applied between the threads of the screw so that the fastener and the post do not separate. In other embodiments, the post may be affixed to the retaining band by insert molding the post during the process of forming the band. In other examples, the post can be adhered to (or through) the band with an adhesive.

Figure 9:
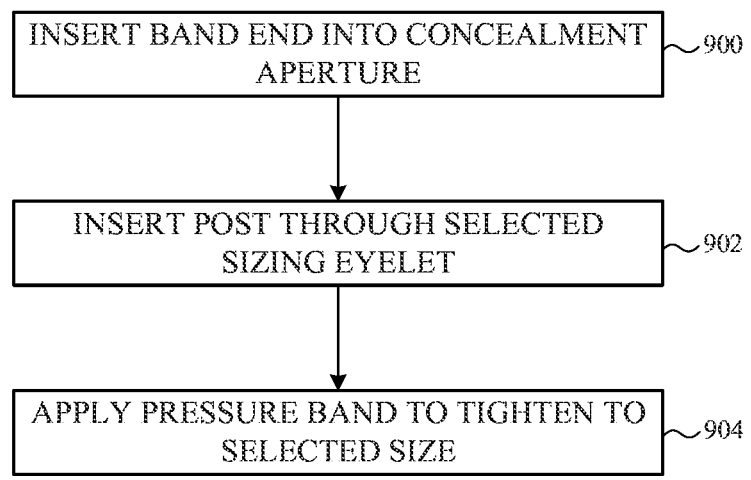
FIG. 9 depicts example operations of a method of securing a wearable device to a user.

FIG. 9 depicts example operations of a method securing a portable electronic device to a user. The method can begin at operation 900 in which a band-insertable end of a sizing band is fed into the concealment aperture of a corresponding retaining band. Thereafter at 902, a post associated with the retaining band can be inserted through a sizing eyelet of the sizing band. Lastly, at 904, pressure can be applied to both bands in order to tighten the band.

FIG. 10 depicts example operations of a method securing a post to a retaining band of an attachment system. The method can begin at operation 1000 in which a post is press fit into a base around in insert-molded washer. In this manner, the post and base can exert pressure to the insert-molded washer and, correspondingly, the post and based can exert pressure on one another. In another non-limiting phrasing, the post and band may be press fit to one another while being press fit to the insert-molded washer. In other embodiments, adhesive may be added between the post and washer, between the post and base, and/or between the washer and base.

Many embodiments of the foregoing disclosure may include or may be described in relation to various methods of operation, use, manufacture, and so on. Notably, the operations of methods presented herein are meant only to be exemplary and, accordingly, are not necessarily exhaustive. For example an alternate operation order, or fewer or additional steps may be required or desired for particular embodiments.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not meant to be exhaustive or to limit the embodiments to the precise forms disclosed. It will be apparent to one of ordinary skill in the art that many modifications and variations are possible in view of the above teachings. In particular, any features described with respect to one embodiment may also be used in other embodiments, where compatible. Likewise, the features of the different embodiments may be exchanged, substituted, or omitted where compatible and appropriate.

We claim:

1. A band system for securing a watch to a user, the band system comprising:
    a first band for insertion into a first channel of a housing of the watch;
    a first structural insert formed within the first band; and
    a first retractable detent configured to engage a first detent recess of the housing, the first retractable detent being positioned at least partially within the first band and the first structural insert;
    a first foot portion coupled to the first retractable detent by a first spring and being moveable within the first structural insert;
    a second band for insertion into a second channel of the housing of the watch, the second band being connectable to the first band;
    a second structural insert formed within the body band;
    a second retractable detent configured to engage a second detent recess of the housing, the second retractable detent being positioned at least partially within the second band and the second structural insert; and
    a second foot portion coupled to the second retractable detent by a second spring and being moveable within the second structural insert.

2. The band system of claim 1, wherein the first band portion is connectable to the second band by:
    multiple eyelets of the first band; and
    a post of the second band and engaging one of the eyelets.

3. The band system of claim 2, wherein the second band further comprises:
    a concealment aperture extending from a first surface of the second band to a second surface of the second band opposite the first surface; and
    a recessed guide bed formed in the second surface of the second band by a pair of side walls extending along a length of the second band and sized to at least partially receive a depth of the first band.

4. The band system of claim 1, wherein:
    the first structural insert comprises a material of greater hardness than a material of the first band; and
    the second structural insert comprises a material of greater hardness than a material of the second band.

5. The band system of claim 1, wherein the second band further comprises a recessed guide bed formed by a pair of side walls extending along a length of the second band.

6. The band system of claim 1, wherein:
    the first band further comprises first friction pads on opposite sides of the first retractable detent; and
    the second band further comprises second friction pads on opposite sides of the second retractable detent.

7. A band for securing a watch to a user, the band comprising:
    an end portion for contacting a channel of a housing of the watch when the band is inserted into the channel;
    a structural insert formed within the end portion;
    a retractable detent;
    a foot portion moveably coupled to the retractable detent; and
    a spring member configured to bias the retractable detent and the foot portion away from each other such that the retractable detent and the foot portion extend through openings on opposite sides of the structural insert and the end portion.

8. The band of claim 7, wherein the retractable detent and the foot portion are configured to move between:
    a first configuration when the band is outside the channel and in which the retractable detent is substantially flush with an outer surface of the end portion and the foot portion extends beyond the outer surface of the end portion; and
    a second configuration when the band is inside the channel and in which the foot portion contacts a wall of the channel, and the retractable detent extends beyond the outer surface of the end portion to extend into a recess formed within the wall of the channel.

9. The band of claim 7, further comprising friction pads on opposite sides of the retractable detent.

10. The band of claim 7, further comprising an insert portion that extends away from the structural insert, the insert portion being more compliant than the end portion of the band that includes the structural insert.

11. A band for securing a watch to a user, the band comprising:
    an end portion for insertion into a channel of a housing of the watch;
    a structural insert formed within the end portion, the structural insert comprising a material of greater hardness than a material of the end portion; and a retractable detent configured to extend from the structural insert and through a first side of the end portion to engage within a recess of the housing, the recess being formed within a wall of the channel, and to secure the end portion within the channel of the housing;

a foot portion configured to extend from the structural insert and through a second side of the end portion, opposite the first side; and an insert portion extending away from the end portion, the insert portion being more compliant than the end portion.

12. The band of claim 11, wherein the structural insert comprises a metal.

13. The band of claim 11, wherein the structural insert is insert molded into the end portion.

14. The band of claim 11, wherein the band is a first band and the insert portion is configured to engage a second band that is attached to the housing of the watch.

15. The band of claim 14, wherein the first band is connected to the second band by:
multiple eyelets of the second band; and
a post of the first band and engaging one of the eyelets.

16. The band of claim 15, wherein the first band further comprises a recessed guide bed formed by a pair of side walls extending along a length of the first band and sized to at least partially receive a depth of the second band.

17. The band of claim 16, wherein a depth of the recessed guide bed is less than a thickness of the second band.

18. The band of claim 11, wherein the structural insert is positioned such that, when the end portion is within the channel of the housing, a back portion of the structural insert is within the channel and a front portion of the structural insert is outside the channel.

19. The band of claim 18, wherein the structural insert tapers from a first cross-sectional dimension at the back portion to a second cross-sectional dimension, smaller than the first cross-sectional dimension, at the front portion.

20. The band of claim 11, wherein the end portion is wider than the insert portion.

21. A watch comprising:
a housing forming:
a channel; and
a recess formed within a wall of the channel; and
a band comprising:
an end portion for insertion into the channel of the housing;
a structural insert formed within the end portion, the structural insert comprising a material of greater hardness than a material of the end portion; and
a locking mechanism configured to extend from the structural insert and through the end portion to engage within the recess of the housing and to secure the end portion within the channel of the housing, the locking mechanism being moveable to extend out of the structural insert and beyond outer surfaces of the end portion on opposing sides of the end portion; and
an insert portion of the end portion extending away from the end portion, the insert portion being more compliant than the end portion.

22. The watch of claim 21, wherein:
the channel is a first channel;
the housing further forms a second channel;
the end portion is a first end portion; and
the band further comprises a second end portion for insertion into the second channel of the housing.

23. The watch of claim 21, wherein the structural insert is positioned such that, when the end portion is within the channel of the housing, a back portion of the structural insert is within the channel and a front portion of the structural insert is outside the channel.

24. The watch of claim 21, wherein the structural insert comprises a metal.

25. The watch of claim 21, wherein the structural insert is insert molded into the end portion.

* * * * *

UNITED STATES PATENT AND TRADEMARK OFFICE
CERTIFICATE OF CORRECTION

PATENT NO. : 11,503,885 B2
APPLICATION NO. : 17/122963
DATED : November 22, 2022
INVENTOR(S) : Osamu Yabe et al.

Page 1 of 1

It is certified that error appears in the above-identified patent and that said Letters Patent is hereby corrected as shown below:

In the Claims

Column 17, Line 63 (Claim 1): Replace "body" with --second--.

Column 18, Line 5 (Claim 2): Remove "portion".

Signed and Sealed this
Twenty-fourth Day of January, 2023

Katherine Kelly Vidal
*Director of the United States Patent and Trademark Office*